(12) United States Patent
Kirsch (10) Patent No.: US 11,260,980 B2
(45) Date of Patent: Mar. 1, 2022

(54) BUCKLE-UP AID FOR PARACHUTIST (71) Applicant: Dieter Kirsch, Bad Langensalza (DE)

(72) Inventor: Dieter Kirsch, Bad Langensalza (DE)

( * ) Notice: Subject to any disclaimer, the term of this patent is extended or adjusted under 35 U.S.C. 154(b) by 30 days.

(21) Appl. No.: 16/566,918

(22) Filed: Sep. 11, 2019

(65) Prior Publication Data

US 2020/0079512 A1 Mar. 12, 2020

(30) Foreign Application Priority Data

Sep. 11, 2018 (DE) ...................... 10 2018 122 128.2

(51) Int. Cl.
*B64D 17/30* (2006.01)
*A62B 35/00* (2006.01)

(52) U.S. Cl.
CPC .......... *B64D 17/30* (2013.01); *A62B 35/0037* (2013.01)

(58) Field of Classification Search
CPC ......... B64D 17/34; B64D 17/04; B64D 17/62
See application file for complete search history.

(56) References Cited

U.S. PATENT DOCUMENTS

| 1,369,456 | A | * | 2/1921 | Meredith | ............. | A47D 15/006 |
| | | | | | | 119/770 |
| 1,891,418 | A | * | 12/1932 | Hoffman | .................. | B64D 7/02 |
| | | | | | | 244/122 B |
| 2,212,746 | A | * | 8/1940 | Nunn | .................... | A47D 13/086 |
| | | | | | | 119/770 |
| 4,593,909 | A | * | 6/1986 | Anselmo | ............ | A63B 69/0059 |
| | | | | | | 473/216 |
| 5,261,728 | A | * | 11/1993 | Carmichael | ............. | B60R 21/12 |
| | | | | | | 280/801.1 |
| 2004/0169411 | A1 | * | 9/2004 | Murray | ................. | B60R 22/105 |
| | | | | | | 297/486 |

* cited by examiner

*Primary Examiner* — Justin M Benedik
(74) *Attorney, Agent, or Firm* — JMB Davis Ben-David (57) ABSTRACT

The invention lies in the field of skydiving and relates to a securing aid (100) for parachutists (20), which has a leg strap connector (101) and a connection element (102) for securing a parachutist (20) in an airplane (104) during the flight preceding the parachute jump. The securing aid (100) is connected or connectable, for example, to the leg strap (13) of a parachute system (10). The securing aid (100) according to the invention thus contributes to increasing the safety of parachutists (20) during the flight preceding the parachute jump.

8 Claims, 9 Drawing Sheets

BUCKLE-UP AID FOR PARACHUTIST

CROSS-REFERENCE TO RELATED APPLICATIONS

Benefit is claimed to German Patent Application No. 10 2018 122 128.2, filed Sep. 11, 2018, the contents of which are incorporated by reference herein in their entirety.

FIELD

The invention lies in the field of skydiving and relates to a securing aid for parachutists, which has a strap and a connection element for securing a parachutist in an airplane during the flight preceding the parachute jump. The securing aid is connected or connectable, for example, to the leg strap of a parachute system. The securing aid according to the invention thus contributes to increasing the safety of parachutists during the flight preceding the parachute jump.

BACKGROUND

Parachutists have to secure themselves in the airplane. For this purpose, securing features, for example straps, are made available on the floor or the walls of the airplane and usually have to be fastened to the leg straps of the harness of the parachute system that is worn by a parachutist. A parachute system consists of a harness and of a container which is sewn onto the latter and which accommodates the parachutes, which are in turn connected to the harness. Elements of the harness include the leg straps, which are guided through the leg strap fastener in the front region and which are fitted on the leg strap connector.

However, conventional parachute systems have no dedicated connection pieces to which the securing strap from the airplane can be fastened. Therefore, the securing of fully equipped parachutists is always a difficult challenge. The same applies when undoing any securing means prior to the parachute jump. By way of illustration, most airplanes used in skydiving do not have any seats for the parachutists. The parachutists in most cases sit on the floor of the airplane or one behind another astride benches, specifically so close together that the freedom of movement of individual parachutists is restricted to such an extent that fitting the securing strap from the floor or from the wall of the airplane to the parachute harness is made very difficult. However, the parachutists need to be secured in order to prevent the parachutists from sliding during the flight, particularly during take-off or during sudden flight maneuvers. Particularly when a large number of parachutists are on board the airplane, the sliding of the parachutists during such flight maneuvers could, like the sliding of unsecured loads in a cargo plane, adversely affect flight safety and cause injuries to the parachutists or even cause the airplane to crash.

It is known to equip aircrews with parachute harnesses in which the parachute and in some cases auxiliary equipment, for example a dinghy, are fastened to the wearer by a system of straps which form a supporting cradle for the wearer during the parachute jump, and also a safety strap which comprises a further strap system by which the wearer, during maneuvers of the airplane, is secured safely to a seat and which can function as an impact absorber in the airplane during events such as an emergency or a crash-landing. In this arrangement, the usual practice is that the pilot, when taking his seat in the airplane, first of all connects the safety strap and adjusts it via the top of the parachute cable harness. These procedures in many cases require the assistance of ground staff. GB 794831 A, for example, discloses such a safety strap combined with a parachute system, wherein the parachutist is secured on the airplane seat via the safety strap on the upper body of the parachutist.

GB 854768 A relates to an aircraft ejector seat with leg-restraining means, wherein a strap is fastened to the seat structure rather than to the safety strap of the airplane seat. When the ejector seat is actuated, the leg-restraining means hold the legs of the pilot on the ejector seat. When the pilot leaves the seat, either automatically or voluntarily, the leg-restraining means are released by a mechanism.

The safety straps and leg-restraining means known from GB 794831 A and GB 854768 A, respectively, are not suitable for use in skydiving, since the parachutists, as described at the outset, do not sit in seats but on the floor of the airplane.

SUMMARY

The object of the invention is therefore to overcome the disadvantages of the prior art. This object is achieved by a securing aid according to Claim 1 and by a parachute system according to Claim 5.

DETAILED DESCRIPTION

The invention makes available a securing aid for parachutists, which has a leg strap connector and a connection element. The leg strap connector preferably consists of a strap. According to the invention, a strap is understood as a strong, band-shaped woven fabric of a material that is customary for parachute harnesses, for example textile fibres or synthetic fibres. The strap can also be made of leather. It is preferable if the band-shaped woven fabric of the strap consists of textile fibres or synthetic fibres or a mixture of both of these. Suitable materials from which the textile fibres or synthetic fibres can be made are, for example, polypropylene, polyester, polyamide, aramid, cotton, viscose and high-strength yarns.

The connection element of the leg strap connection piece is preferably composed of a ring-shaped, oval or polygonal (for example triangular or square) metal clip. The connection element is preferably designed as a metal ring. In another embodiment of the invention, the connection element can also be a carabiner or a carabiner hook. The connection element is connected to the strap and permits simple connection of the leg strap connection piece, for example by latching or hooking, to a securing strap coming from the floor or from the wall of the airplane. Provision can also be made that the connection element is formed by a loop of the strap itself.

It is possible that, in the production of a parachute system, for example of a parachute backpack, the securing aid according to the invention is connected firmly to the harness of the parachute system. This is generally done by sewing. However, the securing aid can also be produced as a separate component. This means that already existing parachute systems can be retrofitted with the securing aid according to the invention. In the simplest case, the securing aid according to this embodiment of the invention has a further means for simple fastening to existing parachute systems. For example, this means can be a loop through which is pulled the end of the leg strap connection piece on which the connection element is located. Alternatively, the further fastening means can also be a ring-shaped, oval or polygonal (for example triangular or square) metal clip or a carabiner through which is pulled the end of the leg strap connection piece on which the connection element is located, or which can be fastened at a suitable location of the parachute system. Conventional parachute backpacks have, for example, a ring connector which connects the main support strap and the leg strap of the harness to each other. Preferably, the securing aid according to the invention is likewise fasteneable to this ring connector.

The invention further relates to a parachute system, in particular a parachute backpack, on which the securing aid according to the invention is either firmly connected or retrofitted. The securing aid is preferably fastened to the leg strap of the parachute system. This permits simple connection to the securing strap coming from the floor or from the wall of the airplane. To increase the convenience for right-handed or for left-handed users, provision can be made to mount the securing aid either on the right-side leg strap or on the left-side leg strap of the parachute system. In a further embodiment of the invention, a securing aid according to the invention can be mounted on both sides of the parachute system, that is to say on the left-side leg strap and on the right-side leg strap. Such a parachute system is thus able to be used universally by right-handed users and also by left-handed users. Moreover, such a parachute system affords the advantage that the parachutist can connect himself to the closest securing strap coming from the floor or from the wall of the airplane, which greatly simplifies the securing procedure.

In a further embodiment of the invention, provision is made that the securing aid is concealed by a protective sleeve on the parachute system. The leg strap and securing aid are for the most part surrounded by a protective sleeve. In this way, the securing aid is barely visible. This embodiment has the advantage that the securing aid does not hang in a freely movable manner on the parachute system, as a result of which it is possible to prevent the leg support connection piece from becoming caught on structural parts of the airplane or on other parachutists when boarding the airplane. The protective sleeve is preferably configured such that the connection element of the leg strap connection piece can be easily pulled out from the protective sleeve when it is to be fastened to the securing strap coming from the floor or from the wall of the airplane. The protective sleeve itself can be formed from the same material as the harness.

The invention further relates to the use of the leg strap connection piece according to the invention for securing a parachutist in an airplane during the flight preceding the parachute jump.

The securing aid according to the invention achieves the object of the invention, namely that of simplified securing of parachutists to the floor or the wall of an airplane in order to prevent sliding of the parachutists during the flight, in particular during take-off or during sudden flight maneuvers, which could adversely affect flight safety, cause injury to the parachutists or even cause the airplane to crash.

Figure 1:
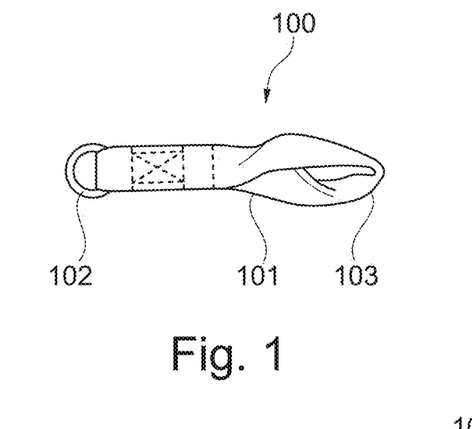
FIG. 1 shows an embodiment of the securing aid according to the invention as a separate component.

The invention is explained in more detail below with reference to eight drawings, in which:

FIG. 1 shows a securing aid 100 according to the invention designed as a separate component. The securing aid 100 has a metal ring as connection element 102. With the metal ring 102, the securing aid 100 is connectable to the securing strap coming from the floor or from the wall of the airplane. The securing aid 100 additionally has a fastening means 103, here configured as a loop, with which the securing aid 100 can be fitted onto a parachute system. For example, the securing aid 100 can be fastened to the leg strap of a parachute backpack.

Figure 2:
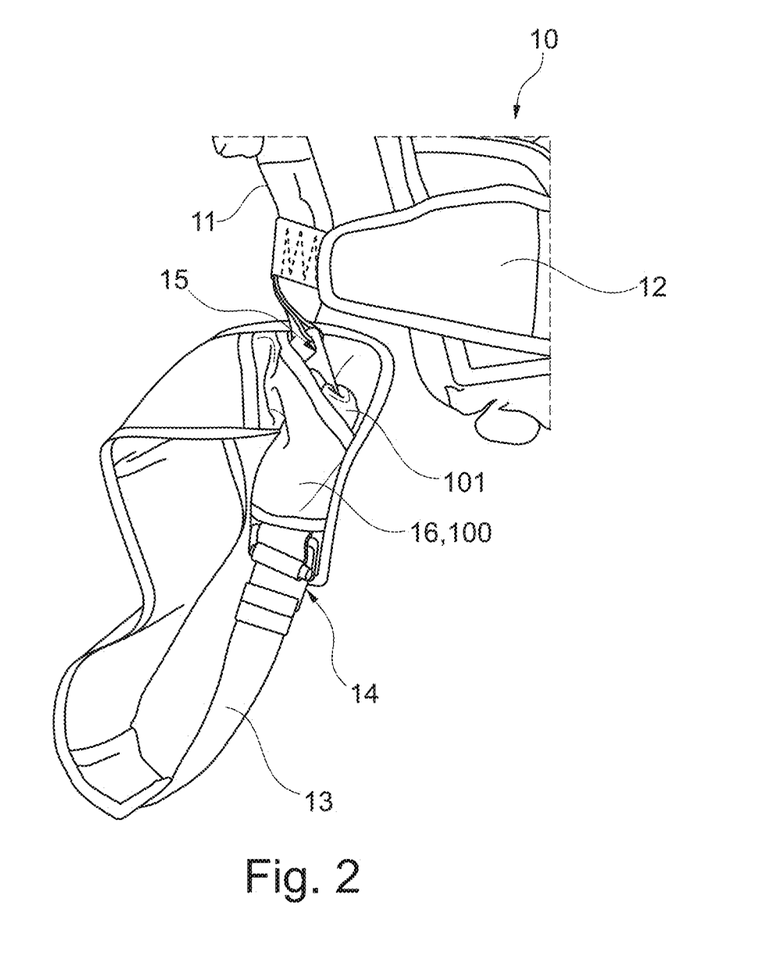
FIG. 2 shows parts of the harness of a parachute backpack with a securing aid according to the invention.

FIG. 2 shows parts of the harness of a parachute backpack 10. The harness shown in FIG. 2 comprises the main support strap 11, the horizontal back strap 12 and leg straps 13. The leg strap 13 has a leg strap fastener with leg strap buckle 14, with which the leg strap can be tightly fastened to the parachutist. The leg strap 13 is connected to the main support strap 11 and to the horizontal back strap 12 via the ring connector 15. The leg strap 13 shown here has a protective sleeve 16 in which the securing aid 100 is located. In the embodiment shown here, the securing aid 100 is fastened to the ring connector 15. For this purpose, the securing aid 100 comprises a connection means (not shown) configured as a loop. The leg strap connector 101 of the securing aid 100 is designed as a strap. Instead of the ring connector 15, the straps can also be sewn on to each other.

Figure 3:
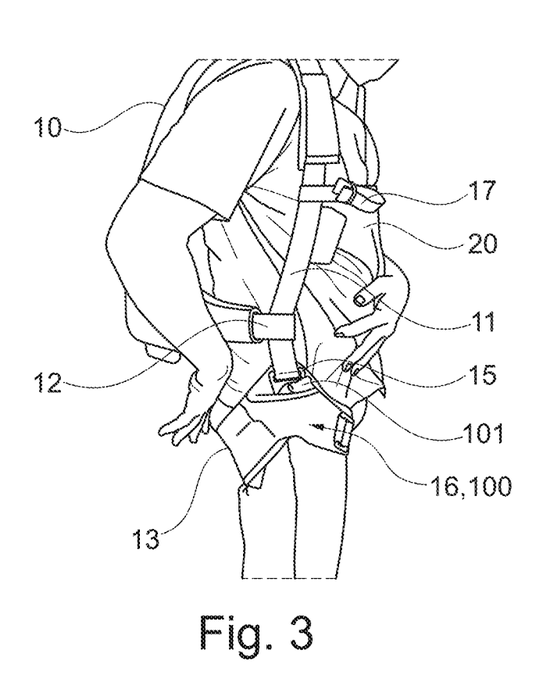
FIG. 3 shows a side view of a parachutist with a parachute backpack and a securing aid, which is located in a protective sleeve.

FIG. 3 shows a side view of a parachutist 20 with a parachute backpack 10. It illustrates the main support strap 11, the horizontal back strap 12 and the leg strap 13. The securing aid 100 lies concealed in a protective sleeve 16. Main support strap 11 and horizontal back strap 12 are sewn together and are connected to the leg strap 13 by a ring connector 15. The securing aid 100 is likewise fastened to the ring connector 15. For this purpose, the securing aid 100 comprises a connection means (not shown) configured as a loop. The leg strap connector 101 of the securing aid 100 is designed as a strap. The main support straps 11 are connected in the front region via a chest strap 17.

Figure 4:
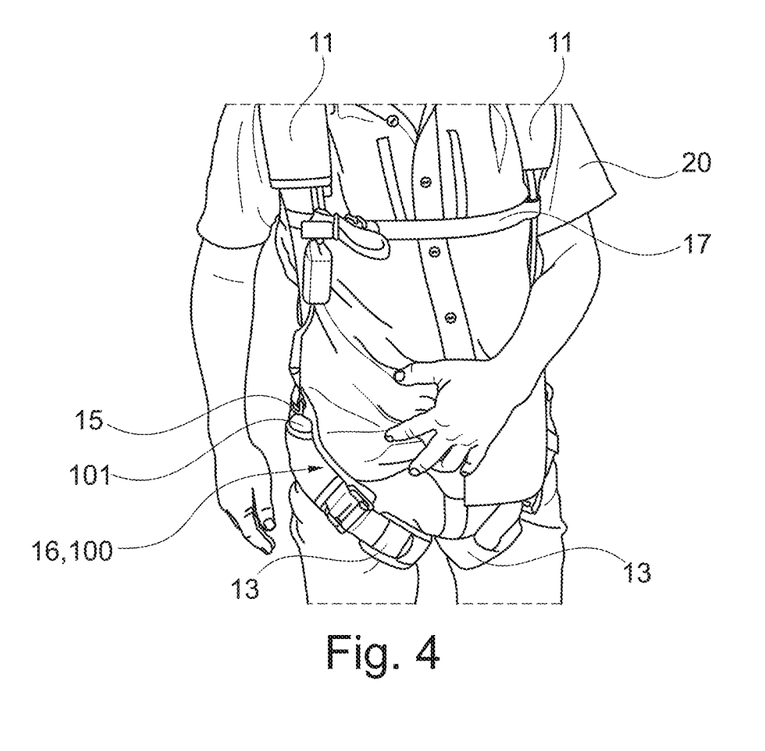
FIG. 4 shows a front view of a parachutist with a parachute backpack and a securing aid, which is located in a protective sleeve.

FIG. 4 shows the parachutist 20 according to FIG. 3, but in a front view. It illustrates the left and right main support strap 11, the right and left leg strap 13, and also the ring connector 15 by which the main support strap 11 and the leg strap 13 are connected to each other and the securing aid 100 is fastened. The securing aid 100 is located in a protective sleeve 16. The leg strap connector 101 of the securing aid 100 is designed as a strap. The main support straps 11 are connected in the front region via a chest strap 17.

Figure 5:
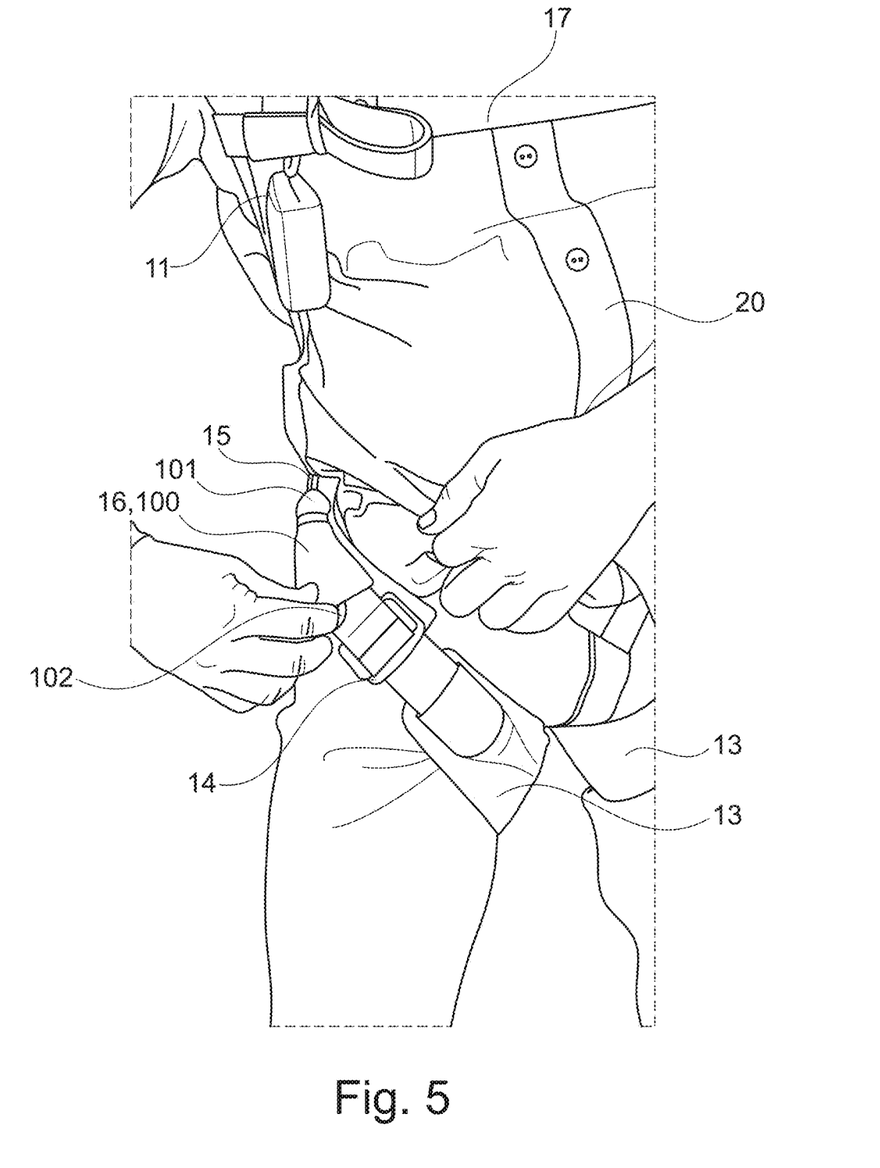
FIG. 5 shows a front view of a parachutist with a parachute backpack, while pulling the securing aid out from the protective sleeve.

FIG. 5 shows the parachutist 20 according to FIGS. 3 and 4 while pulling the securing aid 100 out from the protective sleeve 16 on the right leg strap 13. It illustrates the connection element 102, here designed as a metal ring. With the metal ring 102, the securing aid 100 is connectable to the attachment strap 105 coming from the floor or from the wall of the airplane. The securing aid 100 is fastened to the ring connector 105, which connects the main support strap 11 and the leg strap 13. For this purpose, the securing aid 100 comprises a connection means (not shown) configured as a loop. The leg strap connector 101 of the securing aid 100 is designed as a strap.

Figure 6:
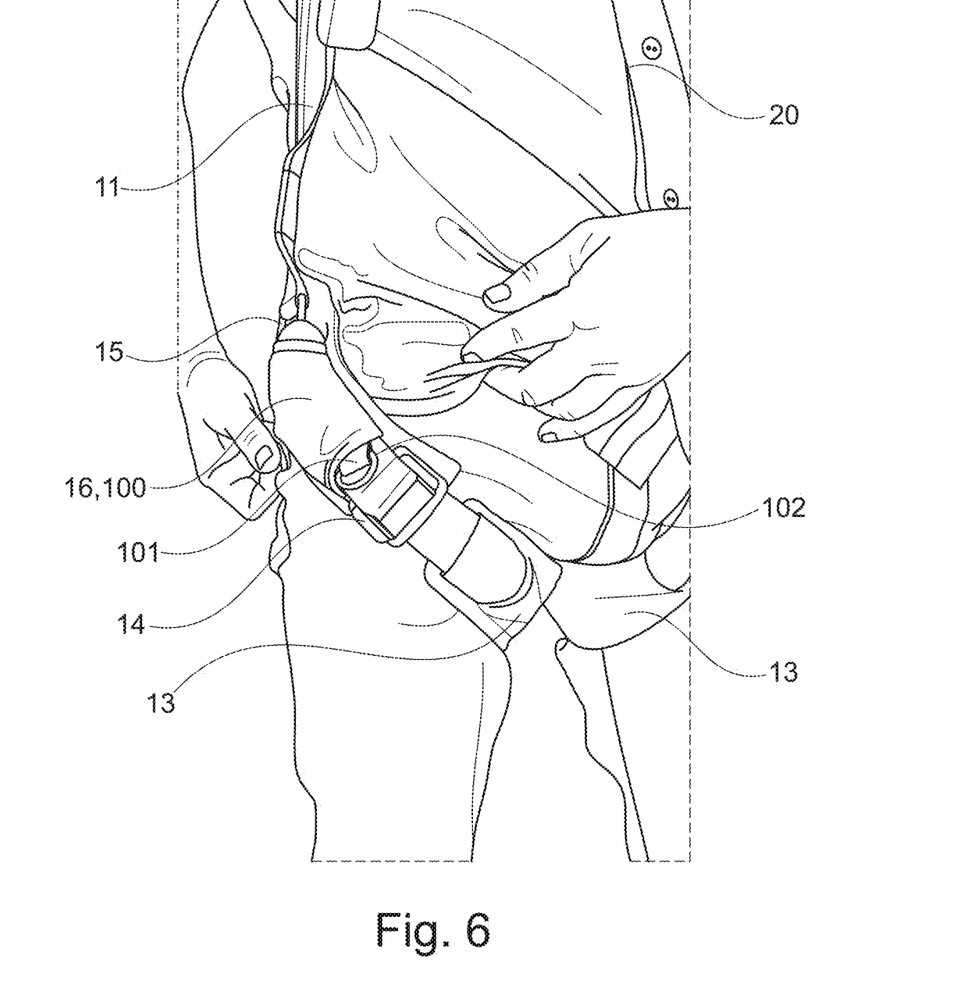
FIG. 6 shows a front view of a parachutist with a parachute backpack, with the securing aid pulled out from the protective sleeve.

FIG. 6 shows the parachutist 20 according to FIGS. 3, 4 and 5, wherein the securing aid 100 has been pulled out from the protective sleeve 16 by the end on which the connection element 102 is located. In the embodiment shown here, the connection element 102 is designed as a metal ring. With the metal ring 102, the securing aid 100 is connectable to the attachment strap 105 coming from the floor or from the wall of the airplane. The leg strap connector 101 is designed as a strap.

Figure 7:
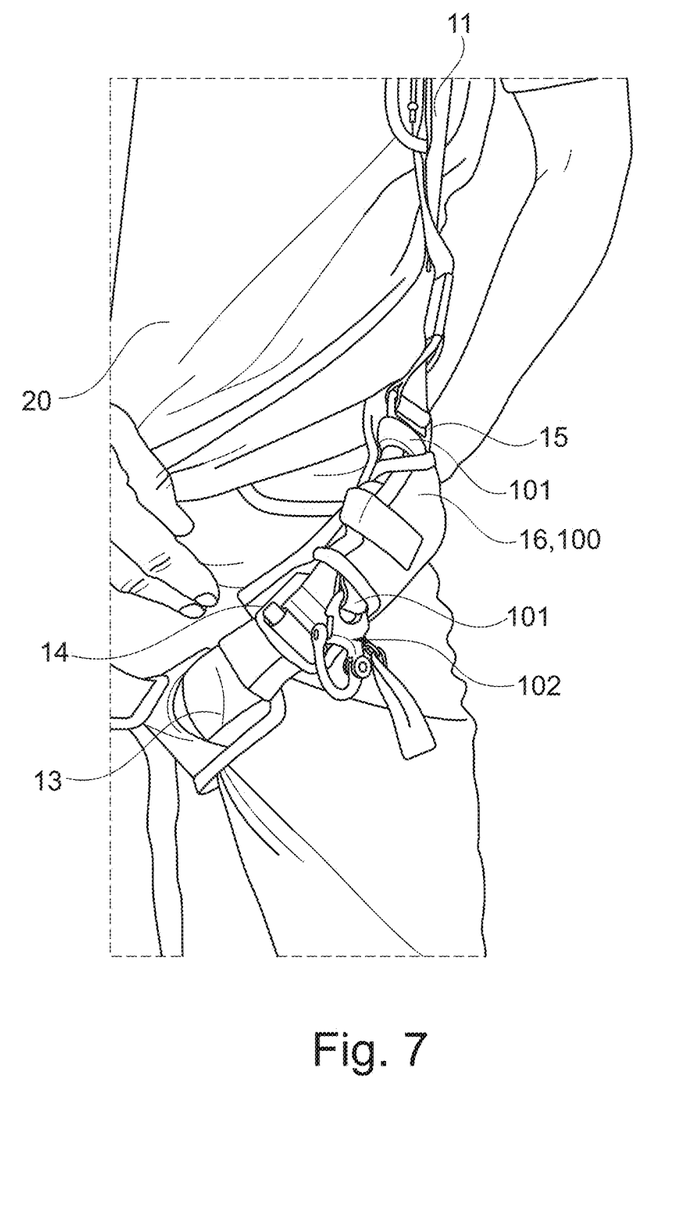
FIG. 7 shows a front view of a parachutist with a parachute backpack, with the securing aid pulled out from the protective sleeve.

FIG. 7 shows a parachutist 20 as in FIGS. 3 to 6. In the embodiment shown here, the securing aid 100 is located on the left leg strap 13. The end of the securing aid 100 on which the connection element 102 is fitted has been pulled out from the protective sleeve 16. In the embodiment shown here, the connection element 102 is designed as a carabiner. With the carabiner 102, the securing aid 100 is connectable to the attachment strap 105 coming from the floor or from the wall of the airplane. The leg strap connector 101 is designed as a strap.

Figure 8:
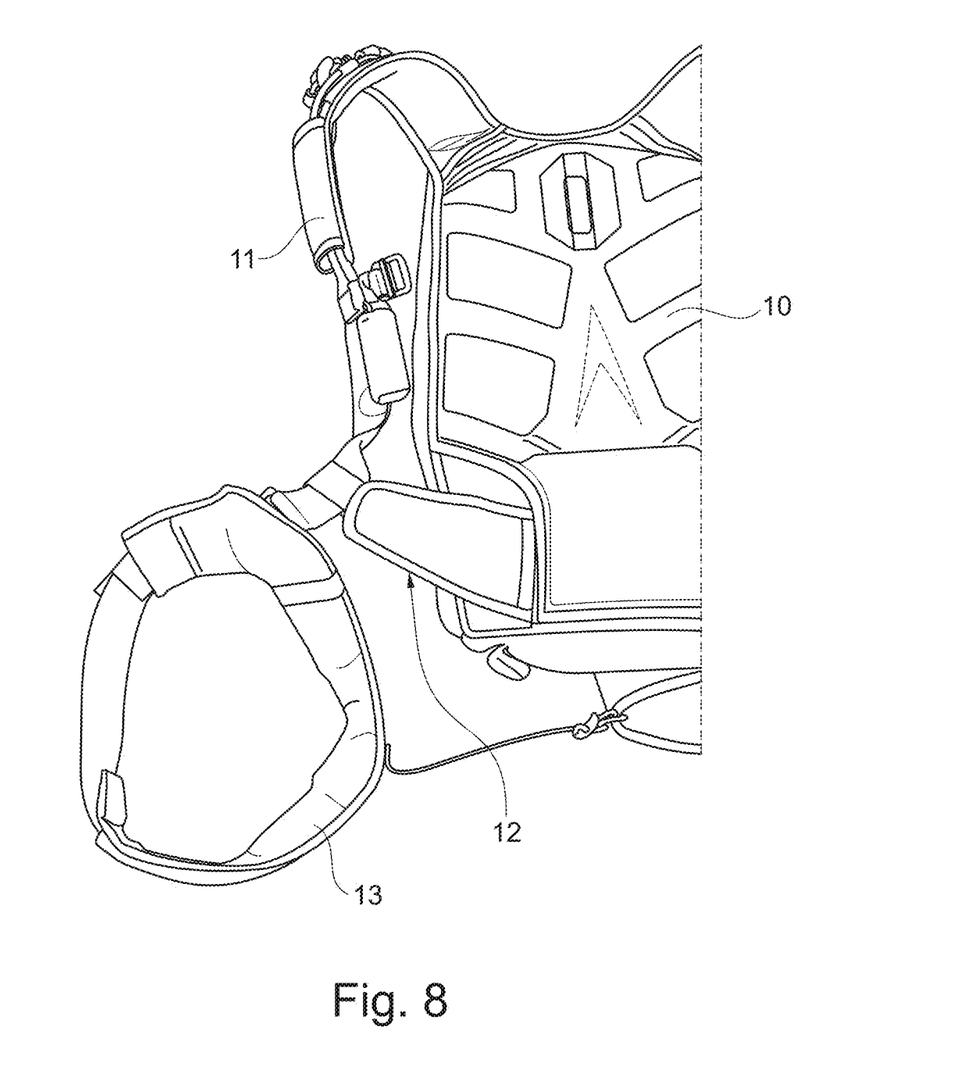
FIG. 8 shows a parachute backpack without securing aid.

FIG. 8 shows a parachute backpack 10 without a securing aid according to the invention. It illustrates the main support strap 11, the horizontal back strap 12 and a leg strap 13. In the embodiment shown here, the main support strap 11 and the horizontal back strap 12 are sewn together.

Figure 9:
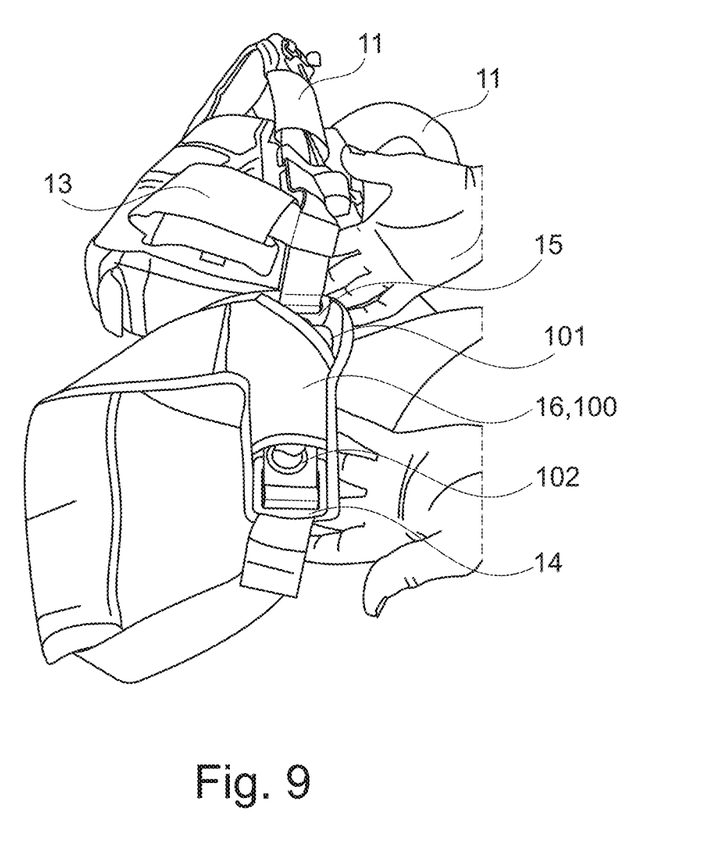
FIG. 9 shows a parachute backpack with a securing aid pulled out from the protective sleeve.

FIG. 9 shows a parachute backpack 10 as in FIG. 8, but with a securing aid 100 according to the invention, which is located in a protective sleeve 16. The leg strap connector is designed as a strap 101. Protruding from the protective sleeve 16 is that part of the securing aid 100 on which the connection means 102 is located for fastening the parachutist to the securing strap 105 coming from the floor or from the wall of the airplane.

In the embodiment shown here, the connection means 102 is designed as a metal ring.

Figure 10:
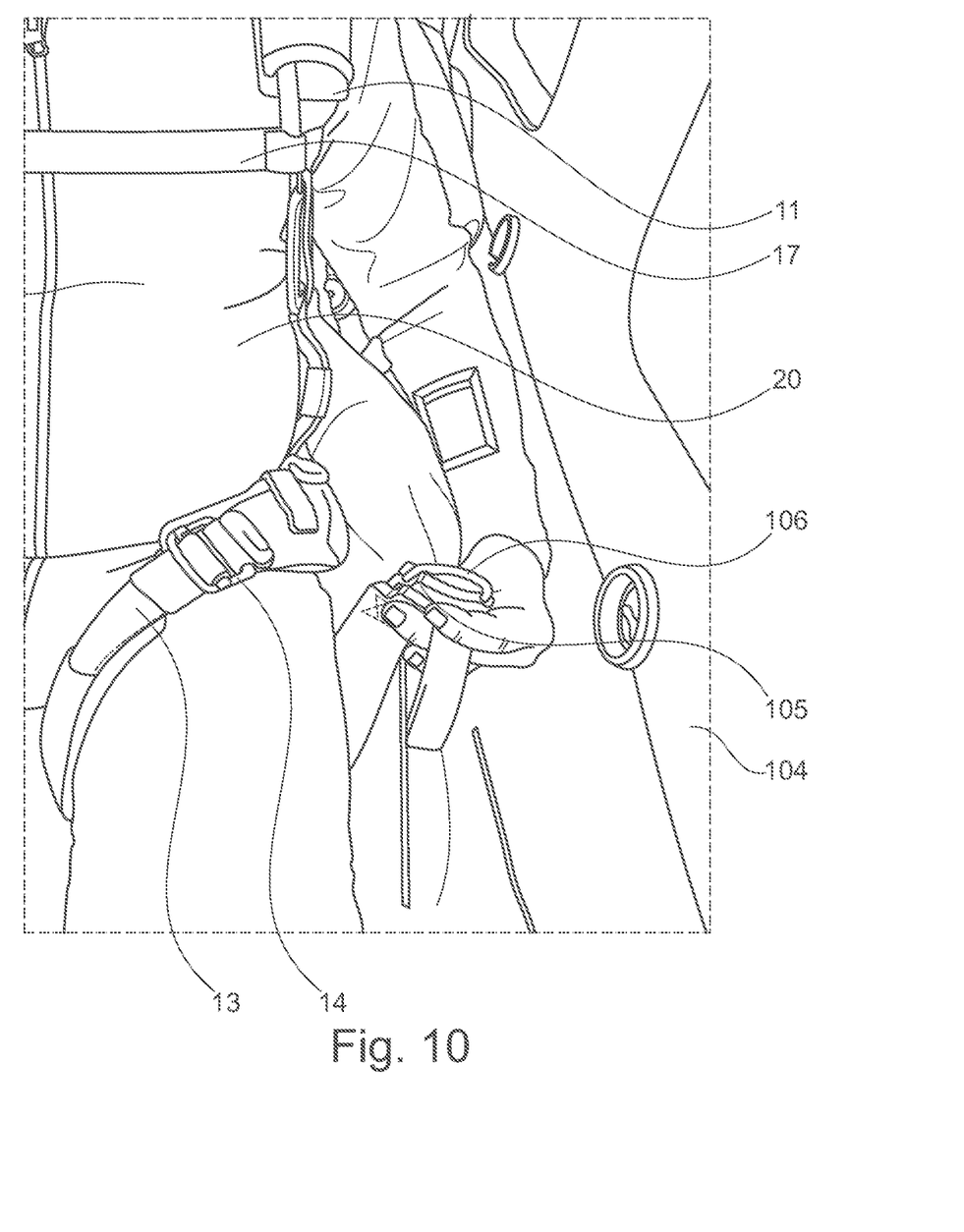
FIG. 10 shows a parachutist securing himself in the airplane.
Figure 11:
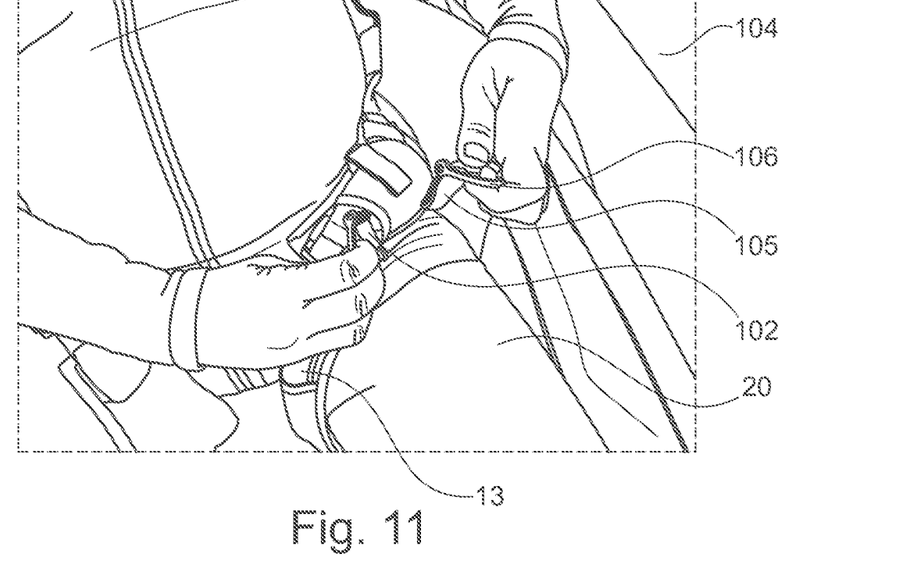
FIG. 11 shows a parachutist securing himself in the airplane.

FIGS. 10 and 11 show a parachutist 20 in an airplane 104 bringing towards him a strap 105 from the floor of the airplane 104. The strap 105 from the floor of the airplane 104 has a connection means 106 which is designed as a carabiner or metal ring and to which the connection means 102 of the securing aid 100 is intended to be connected.

Figure 12:
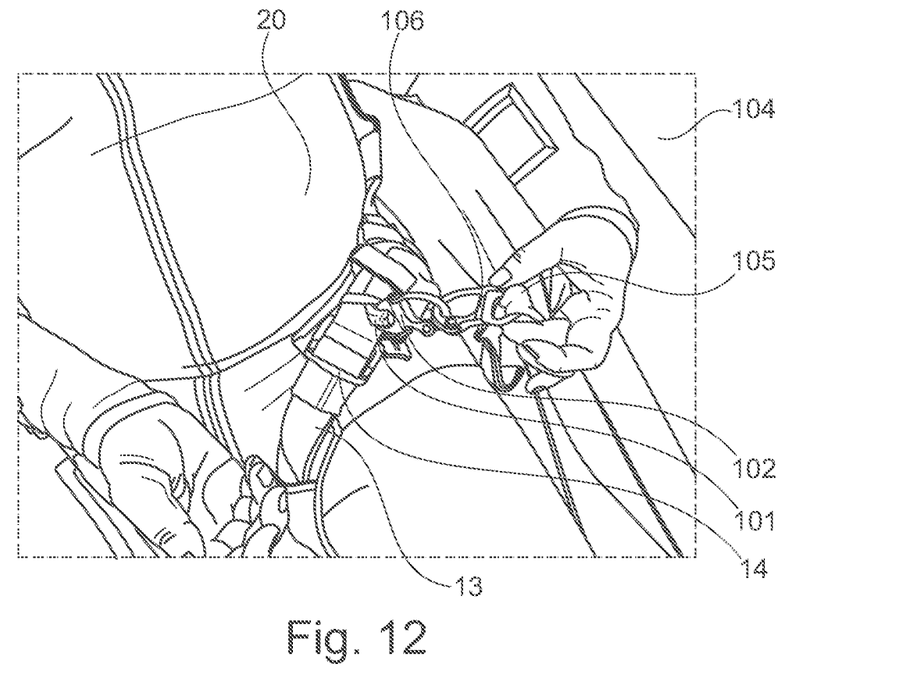
FIG. 12 shows a parachutist secured in an airplane by means of the securing aid according to the invention.

FIG. 12 shows a parachutist 20 in an airplane 104 when secured to a strap 105 coming from the floor of the airplane 104. The strap 105 from the floor of the airplane 104 is connected by the connection means 106, which is designed as a carabiner, to the connection means 102 of the securing aid 100. In the embodiment shown here, the connection means 102 of the securing aid 100 is likewise designed as a carabiner.

LIST OF REFERENCE SIGNS 10 parachute system, parachute backpack
11 main support strap
12 horizontal back strap
13 leg strap
14 leg strap fastener with leg strap buckle
15 ring connector
16 protective sleeve
17 chest strap
20 parachutist
100 securing aid, leg strap connection piece
101 leg strap connector, strap
102 connection element, metal ring, carabiner
103 connection means, loop
104 airplane
105 securing strap of the airplane
106 connection element, metal ring, carabiner of the securing strap of the airplane

I claim:

1. Securing aid (100) for securing a parachutist (20) to the floor or the wall of an airplane (104), said securing aid (100) comprising a leg strap connector (101) and a connection element (102);
    wherein said connection element (102) is selected from the group consisting of a ring-shaped, oval or polygonal metal clip and a carabiner;
    or wherein the connection element (102) is formed by a loop of the strap (101); and
    wherein the connection element (102) permits direct connection to a securing strap coming from the floor or the wall of the airplane;
    and wherein the securing aid (100) is surrounded by a protective sleeve (16), wherein the securing aid (100) is concealed by the protective sleeve (16); and
    wherein the protective sleeve (16) is configured such that the connection element (102) can easily pulled out from the protective sleeve (16).

2. Securing aid (100) according to claim 1, wherein the leg strap connector (101) is a strap.

3. Securing aid (100) according to claim 1, wherein the securing aid (100) is firmly connected to the harness of a parachute system (10).

4. Securing aid (100) according to claim 1, wherein the securing aid (100) has a connection means (103) with which the securing aid (100) can be retrofitted as a separate component to an existing parachute system (10).

5. Parachute system (10) comprising a securing aid (100) according to claim 1.

6. Parachute system (10) according to claim 5, wherein the securing aid (100) is firmly connected to the parachute system (10).

7. Method of securing a parachutist (20) during the flight preceding the parachute jump, said method comprising the step of securing a parachutist (20) with the securing aid (100) according claim 1, by means of a securing strap (105), to the floor or the wall of an airplane (104).

8. Method of securing a parachutist (20) during the flight preceding the parachute jump, said method comprising the step of securing a parachutist (20) with the parachute system (10) according to claim 5, by means of a securing strap (105), to the floor or the wall of an airplane (104).

* * * * *